(12) United States Patent
Tsui et al.

(10) Patent No.: US 10,356,312 B2
(45) Date of Patent: Jul. 16, 2019

(54) CAMERA DEVICE, VIDEO AUTO-TAGGING METHOD AND NON-TRANSITORY COMPUTER READABLE MEDIUM THEREOF

(71) Applicant: HTC CORPORATION, Taoyuan, Taoyuan County (TW)

(72) Inventors: Yuan-Mao Tsui, Taoyuan (TW); Yuan-Kang Wang, Taoyuan (TW); Wen-Chien Liu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 70 days.

(21) Appl. No.: 14/227,214

(22) Filed: Mar. 27, 2014

(65) Prior Publication Data

US 2015/0281567 A1    Oct. 1, 2015

(51) Int. Cl.
*H04N 5/232* (2006.01)
*H04N 7/18* (2006.01)

(52) U.S. Cl.
CPC ..... *H04N 5/23222* (2013.01); *H04N 5/23258* (2013.01); *H04N 7/183* (2013.01); *H04N 7/188* (2013.01)

(58) Field of Classification Search
CPC .......... H04N 5/23219; H04N 5/23216; H04N 5/23229; H04N 5/23258
See application file for complete search history.

(56) References Cited

U.S. PATENT DOCUMENTS

| | | | |
|---|---|---|---|
| 6,526,219 B1 * | 2/2003 | Posa | G11B 27/105 386/240 |
| 2002/0163577 A1 | 11/2002 | Myers | |
| 2006/0256074 A1 * | 11/2006 | Krum | G06F 1/1626 345/156 |
| 2008/0174681 A1 | 7/2008 | Okada et al. | |
| 2011/0228089 A1 | 9/2011 | Almeida | |
| 2012/0148216 A1 * | 6/2012 | Pavagada | H04N 5/772 386/278 |
| 2012/0188343 A1 * | 7/2012 | Matsuura | H04N 13/0221 348/46 |
| 2012/0262576 A1 * | 10/2012 | Sechrist | H04N 21/21805 348/143 |
| 2013/0057713 A1 | 3/2013 | Khawand | |
| 2013/0083202 A1 * | 4/2013 | Batur | H04N 5/23248 348/169 |

(Continued)

FOREIGN PATENT DOCUMENTS

CN    102263899 A    11/2011
CN    102957864 A    3/2013

(Continued)

*Primary Examiner* — Obafemi O Sosanya
(74) *Attorney, Agent, or Firm* — Muncy, Geissler, Olds & Lowe, P.C.

(57) ABSTRACT

A camera device, a video auto-tagging method and a non-transitory computer readable medium thereof are provided. The camera device comprises a processor, a camera and a sensor module. The camera is configured to capture a video. The sensor module is configured to generate distinctive sensing information after sensing a distinctive motion event of an user. The processor is configured to create a timing tag for the video according to the distinctive sensing information.

18 Claims, 3 Drawing Sheets

(56) References Cited

U.S. PATENT DOCUMENTS

| | | | |
|---|---|---|---|
| 2013/0100307 A1* | 4/2013 | Curcio | G06F 17/30038 |
| | | | 348/222.1 |
| 2014/0072284 A1 | 3/2014 | Avrahami et al. | |
| 2014/0112634 A1 | 4/2014 | Yamamoto | |
| 2014/0320698 A1* | 10/2014 | Karivaradaswamy | ................... |
| | | | H04N 5/23293 |
| | | | 348/231.99 |
| 2015/0229812 A1* | 8/2015 | Sandy | A45F 5/00 |
| | | | 348/376 |
| 2015/0235128 A1* | 8/2015 | Mate | G11B 27/00 |
| | | | 706/46 |

FOREIGN PATENT DOCUMENTS

| | | |
|---|---|---|
| CN | 103327233 A | 9/2013 |
| CN | 103339925 A | 10/2013 |
| CN | 103548338 A | 1/2014 |
| TW | 200933188 A | 8/2009 |

* cited by examiner

CAMERA DEVICE, VIDEO AUTO-TAGGING METHOD AND NON-TRANSITORY COMPUTER READABLE MEDIUM THEREOF

CROSS-REFERENCES TO RELATED APPLICATIONS

Not applicable.

BACKGROUND OF THE INVENTION

Field of the Invention

The present invention relates to a camera device, a video auto-tagging method, and a computer readable medium thereof. More specifically, the camera device, the video auto-tagging method, and the computer readable medium of the present invention automatically create tags for the video when significant motions occur.

Descriptions of the Related Art

With the emerging development of the camera devices, it is possible for people to record video while they are doing excises. Therefore, a sport player can wear a camera device and record video of the game with the player's view for later review. Further, a video editor can post-process a player's view video for a highlight program.

However, the playing times of some games (ex. baseball game, tennis game or soccer game) are too long. Accordingly, it bothers the player and the video editor when they want some significant clips of the video since they need to searches the significant clips frame by frame.

Accordingly, an urgent need exists in the art to provide a camera device and a video auto-tagging mechanism that can tag them in the video for later use.

SUMMARY OF THE INVENTION

This invention is to provide a camera device. The camera device comprises a processor, a camera and a sensor module. The camera is connected to the processor electrically and configured to capture a video or a photo. The sensor module is connected to the processor electrically and configured to generate distinctive sensing information after sensing a distinctive motion event of an user. The processor is configured to create a timing tag for the video according to the distinctive sensing information.

This invention is to further provide a video auto-tagging method for use in a camera device. The camera device comprises a processor, a camera and a sensor module. The video auto-tagging method comprises the steps of: capturing a video by the camera; generating distinctive sensing information by the sensor module after sensing a distinctive motion event of an user; and creating a timing tag for the video according to the distinctive sensing information by the processor.

Yet a further objective of this invention is to provide a non-transitory computer readable medium storing a program for a camera device to perform a video auto-tagging method. The camera device comprises a processor, a camera and a sensor module. The program comprises the instructions of a code A for the camera to capture a video; a code B for the sensor module to generate distinctive sensing information after sensing a distinctive motion event of an user; and a code C for the processor to create a timing tag for the video according to the distinctive sensing information.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, the descriptions of these embodiments are only for purposes of illustration rather than limitations. It should be appreciated that in the following embodiments and the attached drawings, the elements not related directly to this invention are omitted from depiction and dimensional relationships among individual elements in the attached drawings are illustrated only for ease of understanding, and not limitation.

Figure 1A:
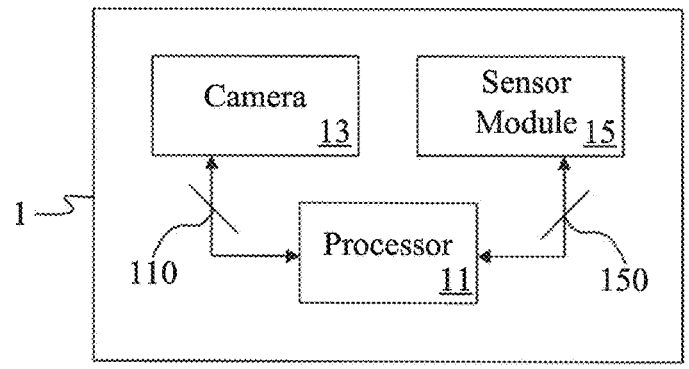
FIG. 1A is a block diagram of a camera device according to a first embodiment of the present invention.

Please refer to FIG. 1A, which is a block diagram of a camera device 1 according to a first embodiment of the present invention. The camera device 1 comprises a processor 11, a camera 13 and a sensor module 15. The camera 13 and the sensor module 15 connect to the processor 11 electrically. Interactions among the components in the first embodiment will be further described hereafter.

First, a user put on the camera device 1, and starts to capture a video 130 by the camera 13 of the camera device 1. Afterwards, since the camera device 1 includes the sensor module 15 and the camera device 1 is on the user, the sensor module 15 is capable of sensing the motions of the user. Hence, when the user performs a distinctive motion event (which means that significant motion event is happening), the sensor module 15 generates distinctive sensing information 150 after sensing the distinctive motion event of the user.

Figure 1B:
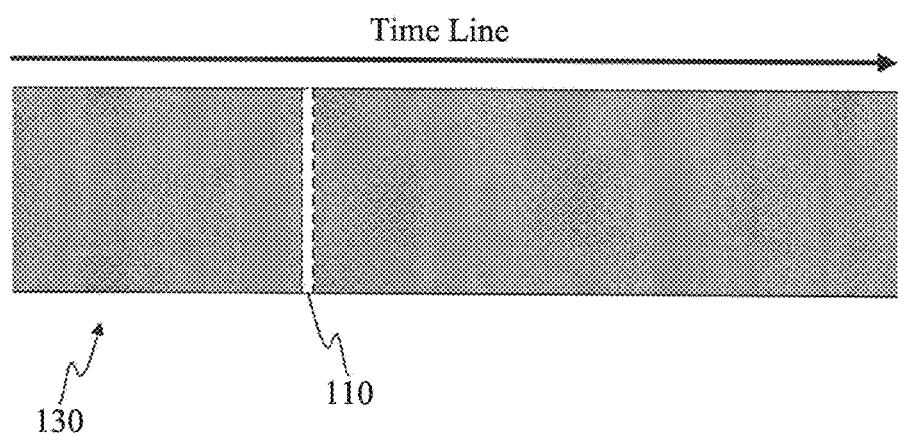
FIG. 1B is a schematic view of stream of the video according to the first embodiment of the present invention.

Please refer FIG. 1B at the same time. FIG. 1B is a schematic view of stream of the video 130 according to the first embodiment of the present invention. Accordingly, since the distinctive sensing information 150 represents the happening of distinctive motion event, the processor 11 then automatically creates a timing tag 110 for the video 130 according to the distinctive sensing information 150.

The timing tag 110 may include, but not limit to, information of a timestamp or a time period of the video. For example, the timing tag 110 may contain information about a timestamp when a moment of the distinctive motion event is happened or time period relevant to the video time when the time period of the distinctive motion event is happened. In practice, the timing tag 110, for example, could be stored in a header of the video or a metadata associating to the video.

In another embodiment, a still photo (not shown) may be captured automatically by the camera 13 when the moment the distinctive motion event is happened or when the timing tag 110 is created. In another embodiment, plurality of still photos (not shown) may be captured continuously and automatically by the camera 13 while the time period of the distinctive motion event is happened.

In other words, the processor 11 creates the timing tag 110 for the video 130 right after the sensor module 15 generates the distinctive sensing information 150. Therefore, based on the above technical features, significant events can be tagged on a video automatically so that, during the post-processing procedure, the user can search the important clips of the video more quickly according to automatic-created timing tags.

Figure 2A:
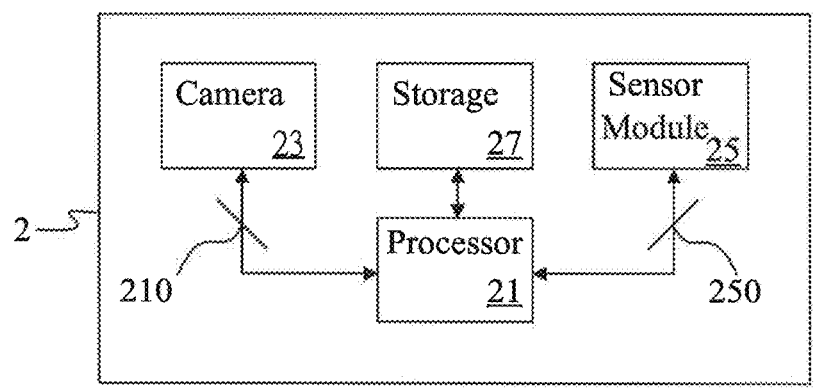
FIG. 2A is a block diagram of a camera device according to a second embodiment of the present invention.

Please refer to FIG. 2A, which is a block diagram of a camera device 2 according to a second embodiment of the present invention. The camera device 2 comprises a processor 21, a camera 23, a sensor module 25 and a storage 27. The camera 23, the sensor module 25 and the storage 27 connect to the processor 21 electrically. Interactions among the components in the second embodiment will be further described hereafter.

Similarly, a user put on the camera device 2, and starts to capture a video 230 by the camera 23 of the camera device 2. Afterwards, since the camera device 2 includes the sensor module 25 and the camera device 2 is on the user, the sensor module 25 is capable of sensing the motions of the user. Hence, when the user performs a distinctive motion event, the sensor module 25 generates distinctive sensing information 250 after sensing the distinctive motion event of the user.

Figure 2B:
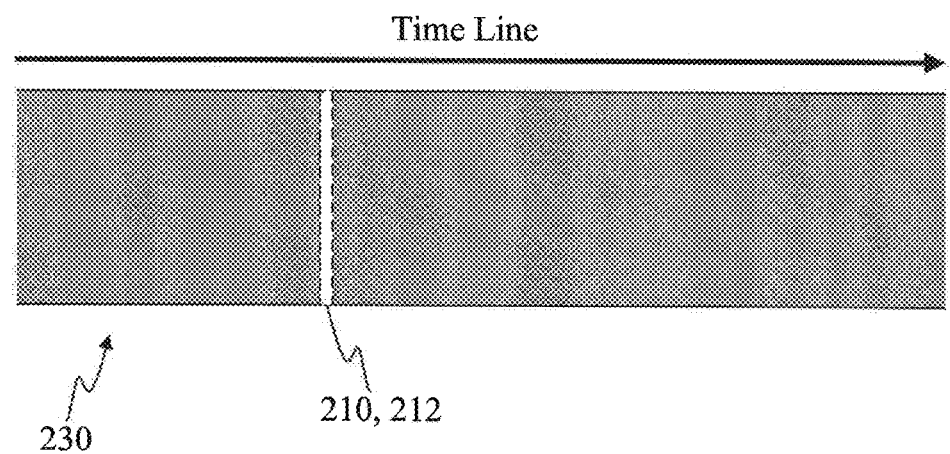
FIG. 2B is schematic view of stream of the video according to the second embodiment of the present invention.

Please refer FIG. 2B at the same time. FIG. 2B is a schematic view of stream of the video 230 according to the second embodiment of the present invention. Accordingly, since the distinctive sensing information 250 represents the happening of distinctive motion event, the processor 21 then automatically creates a timing tag 210 for the video 230 according to the distinctive sensing information 250. In other words, the processor 21 creates the timing tag 210 for the video 230 right after the sensor module 25 generates the distinctive sensing information 250.

Similarly, the timing tag 210 may include, but not limit to, information of a timestamp or a time period of the video. For example, the timing tag 210 may contain information about a timestamp when a moment of the distinctive motion event is happened or time period relevant to the video time when the time period of the distinctive motion event is happened. In practice, the timing tag 210, for example, could be stored in a header of the video or a metadata associating to the video.

In another embodiment, a still photo (not shown) may be captured automatically by the camera 23 when the moment the distinctive motion event is happened or when the timing tag 210 is created. In another embodiment, plurality of still photos (not shown) may be captured continuously and automatically by the camera 23 while the time period of the distinctive motion event is happened.

Moreover, in the second embodiment, the processor 21 is capable of identifying the type of the motions. Particularly, the storage 27 stores a plurality of motion patterns (not shown) which is sensing information of the specific motions. More specifically, a specific motion usually has its own sensing information. For example, when a baseball player performs sliding motion, the sensor senses at least the information of the changes of the acceleration and the height since the baseball player should speed up first and then slide. Therefore, the pattern of sliding motion may be composed of the changes of the acceleration and the height.

Accordingly, based on the motion patterns stored in the storage 27, the processor 21 further determines a motion type information 212 according to the distinctive sensing information 250, and adds the motion type information 212 in the timing tag 210 wherein the motion type information 212 corresponds to one of the plurality of motion patterns. For example, the timing tag 210 may contain a number information '0005' or a text string 'Motion Pattern 5' to indicate the motion type information 212 corresponding to one of the plurality of motion patterns stored in the storage 27. Therefore, based on the above technical features, not only significant events can be tagged on a video automatically, but the types of the motions happened in the significant events can be recorded.

It should be noted that, in the previous embodiments, the sensor module 15 or 25 comprise at least one of an accelerometer sensor, a gyro sensor, a compass sensor and a barometer sensor, and the distinctive sensing information comprises at least one of acceleration information of the accelerometer sensor, an angular momentum information of the gyro sensor, a cardinal direction information of the compass sensor and a barometric pressure information of the barometer sensor. However, this is not intended to limit the implementations of the present invention.

Figure 3:
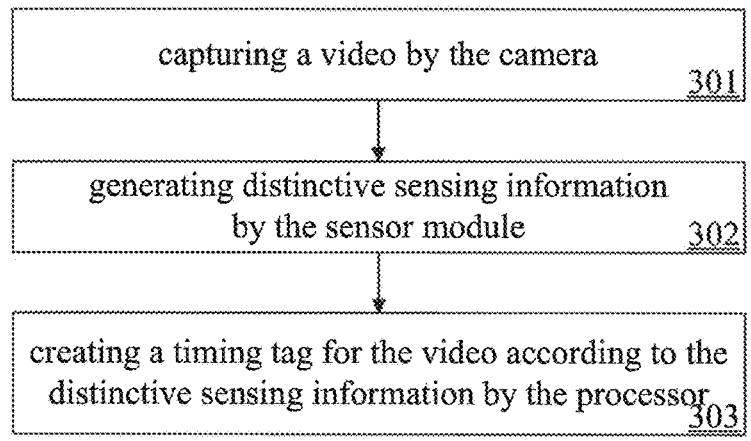
FIG. 3 is a flowchart diagram of a video auto-tagging method according to a third embodiment of the present invention.

A flowchart diagram of a third embodiment of the video auto-tagging method is shown in FIG. 3. The video auto-tagging method of the third embodiment is for use in a camera device (e.g., the camera device 1 of the first embodiment). The camera device comprises a processor, a camera and a sensor module. Steps of the third embodiment are detailed as follows.

Firstly, after a user put on the camera device, step 301 is executed to capture a video by the camera. Then since the camera device includes the sensor module and the camera device is on the user, the sensor module is capable of sensing the motions of the user. Therefore, when the user performs a distinctive motion event, step 302 is executed to generate distinctive sensing information by the sensor module. In practice, whether the sensing information may be generated according to whether the distinctive motion event exceed a predetermine motion variation threshold.

Next, since the distinctive sensing information represents the happening of distinctive motion event, step 303 is executed to create a timing tag automatically for the video according to the distinctive sensing information by the processor. Therefore, based on the above technical features, significant events can be tagged on a video automatically so that, during the video post-processing procedure, the user can search the important clips of the video more quickly according to automatic-created timing tags.

Figure 4:
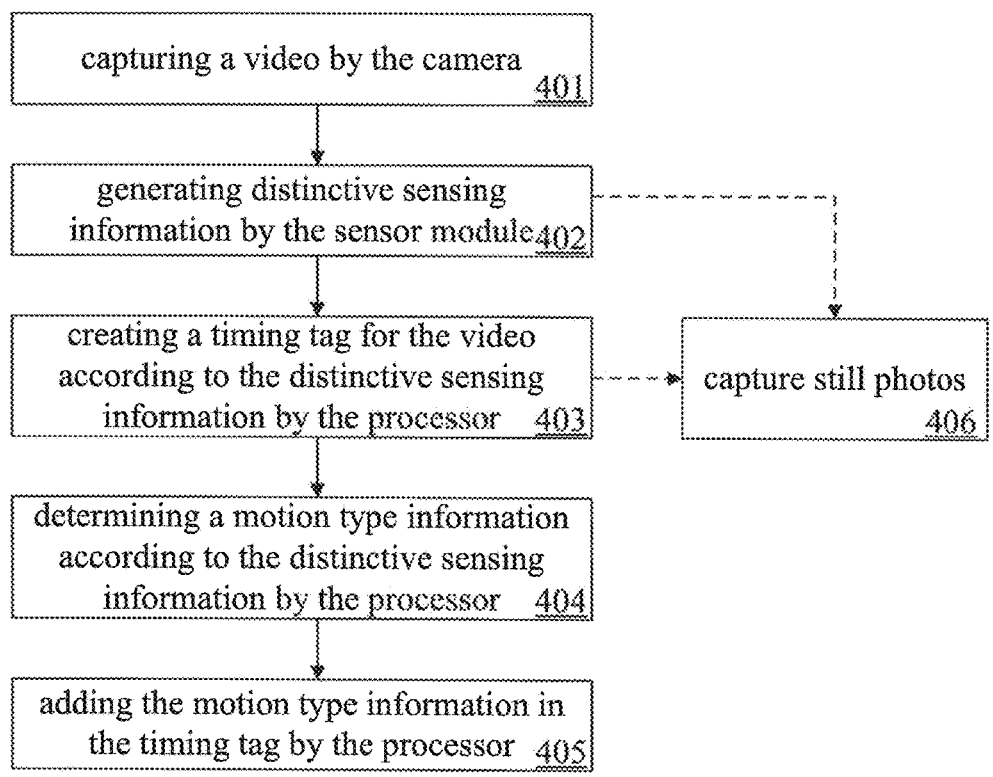
FIG. 4 is a flowchart diagram of a video auto-tagging method according to a fourth embodiment of the present invention.

A flowchart diagram of a fourth embodiment of the video auto-tagging method is shown in FIG. 4. The video auto-tagging method of the fourth embodiment is for use in a camera device (e.g., the camera device 2 of the second embodiment). The camera device comprises a processor, a camera, a sensor module and a storage. The storage stores a plurality of motion patterns. Steps of the fourth embodiment are detailed as follows.

Similarly, after a user put on the camera device, step 401 is executed to capture a video by the camera. Then since the camera device includes the sensor module and the camera device is on the user, the sensor module is capable of sensing the motions of the user. Therefore, when the user performs a motion event, step 402 is executed to generate distinctive sensing information by the sensor module.

Next, since the distinctive sensing information represents the happening of distinctive motion event, step 403 is executed to create a timing tag automatically for the video according to the distinctive sensing information by the processor. Step 404 is executed to determine, based on the motion patterns, a motion type information according to the distinctive sensing information by the processor.

Afterwards, step 405 is executed to adding the motion type information in the timing tag by the processor. Therefore, not only significant events can be tagged on a video automatically, but the types of the motions happened in the significant events can be recorded as well.

It should be noted that step 403 and step 405 may be combined and executed after step 404. For example, after step 404, the step 405 is executed to create a timing tag with the motion type information according to the distinctive sensing information.

Furthermore, step 406 can be executed to capture a still photo automatically when the moment the distinctive motion event is happened or when the timing tag is created. Similarly, if the time period of the distinctive motion event is happened, a plurality of still photos may be captured continuously and automatically.

It should be noted that the video auto-tagging methods of the third and fourth embodiments may be implemented by a computer program having a plurality of codes. The computer program is stored in a non-transitory computer readable storage medium. When the computer program is loaded into a processing unit and the codes are executed by the processing unit, the video auto-tagging methods of the third and fourth embodiments can be accomplished. The non-transitory computer readable storage medium may be a read only memory (ROM), a flash memory, a floppy disk, a hard disk, a compact disk (CD), a DVD, a BD, a mobile disk, a magnetic tape, a database accessible to networks, or any other storage media with the same function and well known to those skilled in the art.

According to the above descriptions, the camera device and the video auto-tagging method of the present invention can automatically create tags for the video when significant motions occur. Therefore, the later review or the post-processing procedure of the video would become more convenient.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A camera device, comprising:
   a processor;
   a camera, being connected to the processor electrically and configured to capture a video;
   a sensor module, being connected to the processor electrically and configured to generate distinctive sensing information while the sensor module senses that a distinctive motion event of camera device exceeds a predetermine motion variation threshold;
   wherein in response to the distinctive motion event of camera device exceeding the predetermine motion variation threshold and the distinctive sensing information being generated during capture of the video, the processor is configured to create a timing tag for the video and store the timing tag in the video according to the distinctive sensing information,
   wherein the camera captures a plurality of still photos automatically after the video capture has started and while the video is being captured, in response to the distinctive motion event that is happening;
   wherein the plurality of still photos are separately captured and stored, automatically in real time, in addition to the video during the time period of the distinctive motion event.

2. The camera device as claimed in claim 1, further comprising:
   a storage, being connected to the processor electrically and configured to store a plurality of motion patterns;
   wherein the processor is further configured to determine, based on the plurality of motion patterns, a motion type information according to the distinctive sensing information, and add the motion type information in the timing tag;
   wherein the timing tag contains at least a text string indicating the motion type information which corresponds to one of the plurality of motion patterns.

3. The camera device as claimed in claim 1, wherein the sensor module comprises at least one of an accelerometer sensor, a gyro sensor, a compass sensor and a barometer sensor, and the distinctive sensing information comprises at least one of acceleration information of the accelerometer sensor, an angular momentum information of the gyro sensor, a cardinal direction information of the compass sensor and barometric pressure information of the barometer sensor.

4. The camera device as claimed in claim 1, wherein the camera captures one still image of the plurality of still photos when the timing tag is created.

5. The camera device as claimed in claim 1, wherein the timing tag comprises information of a timestamp and a time period of the video, and wherein the timestamp represents a beginning of the distinctive motion event.

6. A video auto-tagging method for use in a camera device, the video auto-tagging method comprising:
   capturing a video;
   generating distinctive sensing information while a sensor of the camera senses that a distinctive motion event of camera device exceeds a predetermine motion variation threshold;
   creating, in response to the distinctive motion event of camera device exceeding the predetermine motion variation threshold and the distinctive sensing information being generated during capture of the video, a timing tag for the video and storing the timing tag in the video according to the distinctive sensing information; and
   capturing a plurality of still photos automatically after the video capture has started and while the video is being captured, in response to the distinctive motion event that is happening,
   wherein the plurality of still photos are separately captured and stored, automatically in real time, in addition to the video at the time period of the distinctive motion event.

7. The video auto-tagging method as claimed in claim 6, wherein the camera device further comprises a storage, the storage stores a plurality of motion patterns, the video auto-tagging method further comprises:
   determining, based on the plurality of motion patterns, a motion type information according to the distinctive sensing information;

adding the motion type information in the timing tag;
wherein the timing tag contains at least a text string indicating the motion type information which corresponds to one of the plurality of motion patterns.

8. The video auto-tagging method as claimed in claim 6, further comprising: capturing a still photo automatically when the distinctive motion event is happened or when the timing tag is created.

9. The video auto-tagging method as claimed in claim 6, wherein the distinctive sensing information comprises at least one of acceleration information of an accelerometer sensor, angular momentum information of a gyro sensor, cardinal direction information of a compass sensor and barometric pressure information of a barometer sensor.

10. The video auto-tagging method as claimed in claim 6, wherein the timing tag comprises information of a timestamp or a time period of the video while the timestamp represents a happening moment of the distinctive motion event and the time period represents a happening period of the distinctive motion event.

11. A non-transitory computer readable medium storing a program for a camera device to perform a video auto-tagging method, the program comprising:
   a code A to capture a video;
   a code B to generate distinctive sensing information while a sensor of the camera senses that a distinctive motion event of camera device exceeds a predetermine motion variation threshold;
   a code C to create, in response to the distinctive motion event of camera device exceeding the predetermine motion variation threshold and the distinctive sensing information being generated during capture of the video, a timing tag for the video and store the timing tag in the video according to the distinctive sensing information, and to capture a plurality of still photos automatically after the video capture has started and while the video is being captured, in response to the distinctive motion event that is happening,
   wherein the plurality of still photos are separately captured and stored, automatically in real time, in addition to the video at the time period of the distinctive motion event.

12. The non-transitory computer readable medium as claimed in claim 11, wherein the program further comprises:
   a code D to determine, based on a plurality of motion patterns, a motion type information according to the distinctive sensing information;
   a code E to add the motion type information in the timing tag;
   wherein the timing tag contains at least a text string indicating the motion type information which corresponds to one of the plurality of motion patterns.

13. The non-transitory computer readable medium as claimed in claim 11, wherein the program further comprises:
   a code F to capture a still photo automatically when the distinctive motion event is happened or when the timing tag is created.

14. The non-transitory computer readable medium as claimed in claim 11, wherein the distinctive sensing information comprises at least one of acceleration information of an accelerometer sensor, angular momentum information of a gyro sensor, cardinal direction information of a compass sensor and barometric pressure information of a barometer sensor.

15. The non-transitory computer readable medium as claimed in claim 11, wherein the timing tag comprises information of a timestamp or a time period of the video while the timestamp represents a happening moment of the distinctive motion event and the time period represents a happening period of the distinctive motion event.

16. The camera device as claimed in claim 1, wherein in response to the distinctive motion event of camera device exceeding the predetermine motion variation threshold and the distinctive sensing information being generated during capture of the video, the processor is configured to create a timing tag for the video and store the timing tag in a header of the video according to the distinctive sensing information.

17. The video auto-tagging method as claimed in claim 6, wherein the video auto-tagging method further comprises:
   creating, in response to the distinctive motion event of camera device exceeding the predetermine motion variation threshold and the distinctive sensing information being generated during capture of the video, a timing tag for the video and storing the timing tag in a header of the video according to the distinctive sensing information.

18. The non-transitory computer readable medium as claimed in claim 11, wherein the program further comprises:
   the code C to create, in response to the distinctive motion event of camera device exceeding the predetermine motion variation threshold and the distinctive sensing information being generated during capture of the video, a timing tag for the video and store the timing tag in a header of the video according to the distinctive sensing information.

\* \* \* \* \*